United States Patent [19]

Couput et al.

[11] Patent Number: 5,274,493
[45] Date of Patent: Dec. 28, 1993

[54] ELECTROCHROMIC ELEMENT, MATERIALS FOR USE IN SUCH ELEMENT, PROCESSES FOR MAKING SUCH ELEMENT AND SUCH MATERIALS AND USE OF SUCH ELEMENT IN AN ELECTROCHROMIC GLASS DEVICE

[75] Inventors: Jean-Paul Couput, Bizanos; Guy Campet, Canejan; Jean M. Chabagno, Pau; Daniel Muller, Pau; Maurice Bourrel, Pau, all of France; Ryan R. Dirkx, Belle Mead, N.J.; Didier Ferry, Artix, France; Regine Garie, St Etienne, France; Claude Delmas, Talence, France; Catherine Geoffroy, Colombes, France; Bertrand Morel, Pau, France; Josik Portier, Gradignan, France; Jean Salardenne, Pessac, France

[73] Assignees: Elf Atochem North America, Inc., Philadelphia, Pa.; Societe Nationale Elf Aquitaine, Paris, France; a part interest

[21] Appl. No.: 809,497
[22] PCT Filed: Jul. 13, 1990
[86] PCT No.: PCT/US90/03873
§ 371 Date: Mar. 12, 1992
§ 102(e) Date: Mar. 12, 1992
[87] PCT Pub. No.: WO91/01510
PCT Pub. Date: Feb. 7, 1991

Related U.S. Application Data

[63] Continuation-in-part of Ser. No. 379,225, Jul. 13, 1989, Pat. No. 5,086,351.

[51] Int. Cl.$^5$ .............................. G02F 1/01; G02B 5/23
[52] U.S. Cl. .................................... 359/275; 359/265; 252/586; 204/192.1
[58] Field of Search .................... 359/265, 275, 273; 204/192.1; 252/586; 427/126.1, 164; 429/192

[56] References Cited

U.S. PATENT DOCUMENTS 3,451,741 6/1969 Manos .............................. 359/265

(List Continued on next page.)

FOREIGN PATENT DOCUMENTS 0373020 6/1990 European Pat. Off. .

(List Continued on next page.)

OTHER PUBLICATIONS

Ronald B. Goldner, Electrochromic Materials for Controlled Radiant Energy Transfer in Buildings, pp. 38-44. (No Date).

(List Continued on next page.)

Primary Examiner—Scott J. Sugarman
Assistant Examiner—Evelyn A. Lester
Attorney, Agent, or Firm—Finnegan, Henderson, Farabow, Garrett & Dunner

[57] ABSTRACT

An electrochromic element useful in an electrochromic glass or mirror device and a process for making such element. The element is a five-layered structure including an electrolyte ion conducting layer interposed between first and second inorganic electrochromic layers which are interposed between a pair of conductive electrodes. The second inorganic electrochromic layer is amorphous. The first and second inorganic electrochromic layers are different and are capable of exhibiting color-forming properties complementary to one another upon the incorporation of at least one H, Li, Na, K, Ag, Cu or Tl ion. The electrolyte ion conducting layer may be a copolymer of ethylene oxide, butylene oxide or methyl glycidyl ether, and optionally a small amount of allyl glycidyl ether, along with an ionizable salt, or may be a polyurethane gel formed by reacting the copolymer with triisocyanate, along with an ionizable salt. The second inorganic electrochromic layer comprises a transition element chalcogenide or halide which exhibits a color change when shifting between the +2 and +3 valence states or between the +3 and +4 valence states. The second inorganic electrochromic layer may be produced by an electrochemical process, a chemical process, a physical process or by a solid state process. The electrochromic element may also comprise a plurality of five-layer structures in tandem, each pair separated by a substrate. The electrochromic element of the invention is also useful as a supercapacitor.

34 Claims, 1 Drawing Sheet

U.S. PATENT DOCUMENTS

| | | | |
|---|---|---|---|
| 4,006,966 | 2/1977 | Meyers et al. | 359/265 |
| 4,116,546 | 9/1978 | Leibowitz | 359/265 |
| 4,117,103 | 9/1978 | Hong | 423/593 |
| 4,193,670 | 3/1980 | Giglia et al. | 359/265 |
| 4,278,329 | 7/1981 | Matsuhiro et al. | 359/265 |
| 4,303,748 | 12/1981 | Armand et al. | 429/192 |
| 4,312,929 | 1/1982 | Randin | 429/188 |
| 4,338,000 | 7/1982 | Kamimori et al. | 359/265 |
| 4,357,401 | 11/1982 | Andre et al. | 429/192 |
| 4,435,048 | 3/1984 | Kamimori et al. | 359/265 |
| 4,448,493 | 5/1984 | Matsudaira et al. | 359/265 |
| 4,449,790 | 5/1984 | Thoni | 359/265 |
| 4,464,447 | 8/1984 | Lazzari et al. | 429/194 |
| 4,471,037 | 9/1984 | Bannister | 429/191 |
| 4,497,726 | 2/1985 | Brule et al. | 252/182.1 |
| 4,498,739 | 2/1985 | Itaya et al. | 359/265 |
| 4,505,997 | 3/1985 | Armand et al. | 429/192 |
| 4,573,768 | 3/1986 | Polak et al. | |
| 4,578,326 | 3/1986 | Armand et al. | 429/192 |
| 4,585,312 | 4/1986 | Ishiwata et al. | 359/265 |
| 4,620,944 | 11/1986 | Armand et al. | 252/518 |
| 4,638,407 | 1/1987 | Lundsgaard | 361/433 |
| 4,654,279 | 3/1987 | Bauer et al. | 429/192 |
| 4,664,934 | 5/1987 | Ito et al. | 427/38 |
| 4,671,619 | 6/1987 | Kamimori et al. | 359/265 |
| 4,690,840 | 9/1987 | Gauthier et al. | 427/436 |
| 4,712,879 | 12/1987 | Lynam et al. | 359/265 |
| 4,722,877 | 2/1988 | Sammells | |
| 4,749,260 | 6/1988 | Yang et al. | 359/265 |
| 4,750,816 | 6/1988 | Ito et al. | 359/265 |
| 4,750,817 | 6/1988 | Sammells | 359/265 |
| 4,752,544 | 6/1988 | Gregory | 429/192 |
| 4,758,483 | 7/1988 | Armand et al. | 429/192 |
| 4,798,773 | 1/1989 | Yasukawa et al. | |
| 4,801,195 | 1/1989 | Kawai et al. | 359/265 |
| 4,807,977 | 2/1989 | Sammells | |
| 4,828,369 | 5/1989 | Hotomi | |
| 4,851,307 | 7/1989 | Armand et al. | 429/192 |
| 4,867,541 | 9/1989 | Hotomi | |
| 4,878,743 | 11/1989 | Aikawa et al. | 359/265 |
| 4,882,243 | 11/1989 | Skotheim et al. | |
| 4,908,283 | 3/1990 | Takahashi et al. | |
| 4,911,995 | 3/1990 | Belanger et al. | 429/192 |
| 4,938,571 | 7/1990 | Cogan et al. | |
| 5,086,351 | 2/1992 | Couput et al. | 359/265 |

FOREIGN PATENT DOCUMENTS

| | | |
|---|---|---|
| 59-102216 | 6/1984 | Japan. |
| 60-28630 | 2/1985 | Japan. |
| 277927 | 12/1986 | Japan. |
| 2-226122 | 9/1990 | Japan. |
| 89-10578 | 11/1989 | PCT Int'l Appl. . |

OTHER PUBLICATIONS

Svensson et al., No Visible Electrochromism in High-Quality E-Beam Evaporated In2O3:Sn Films, Aug. 1, 1985, pp. 2284–2285.

Cogan et al., Materials and Devices in Electrochromic Window Development, pp. 23–31 (1985).

Lampert, Electrochromic Materials and Devices for Energy Efficient Windows, pp. 1–27 (1984).

Schuster et al., Solid State Electrochromic Infrared Switchable Windows, pp. 153–160 (1986).

Svensson et al., Electrochromism of Nickel-Based Sputtered Coatings pp. 19–26 (1987).

Babulanam et al., Smart Window Coatings: Some Recent Advances, pp. 64–71 (1987).

Cogan et al., Optical Switching in "Complementary" Electrochromic Windows, pp. 32–38 (1986).

Yu et al., In-Situ Spectroscopic Studies of Electrochromic Hydrated Nickel Oxide Films, pp. 113–123 (1987).

Fantini et al., Electrochromic Nickel Hydroxide Films on Transparent/Conducting Substrates, pp. 487–500 (1987).

Stefan et al., Optical Properties of Electrochromic Hydrated Nickel Oxide Coatings Made by rf Sputtering, pp. 1554–1556 (1987).

Emrich et al., Surface Analysis of Electrochromic Displays of Iron Hexacyanoferrate Films by X-Ray Photoelectron Spectroscopy, pp. 1307–1310 (1987).

"Ion Conductivity of Poly(ethylene oxide)-based Polyurethane Networks Containing Alkali Metal Salts", Tada et al., Jour. of Polymer Science Part A: Polymer Chemistry, vol. 25, pp. 3015–3024 (1987).

"Rilevatori Termoelettrocromici A Stato Solido", Bonino et al., La Chimica E L'Industria, V. 69, N. 7–8 (1987).

"Electrochromism And Electrochromic Devices", Scrosati, Chimicaoggi, Jun. 1989.

"An Electrochromic Window Based on $Li_xWO_3$/$(PEO)_8LiClO_4$/NiO", Passerini et al., J. Electrochem. Society, vol. 136, No. 11, Nov. 1989.

Rauh et al., "Materials for Electrochromic Windows", SPIE, vol. 502, Optical Materials Technology for Energy Efficiency and Solar Energy Conversion III, pp. 38–45 (1984).

Tada et al., "Electrochromic Windows Using a Solid Polymer Electrolyte, Solar Energy Materials", vol. 16, pp. 509–516 (1987).

"Polymer Conducts Protons at Room Temperature", C&EN, Nov. 25, 1985, pp. 28–29.

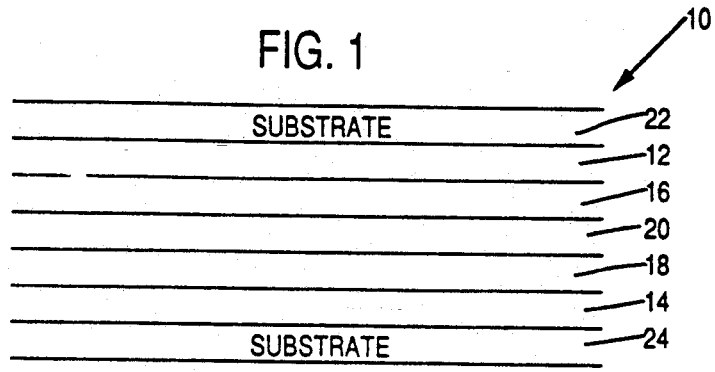
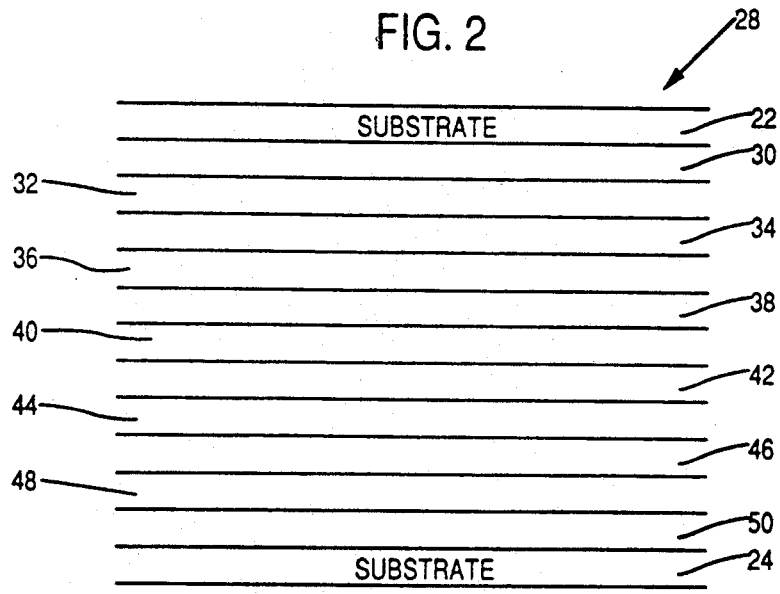

ELECTROCHROMIC ELEMENT, MATERIALS FOR USE IN SUCH ELEMENT, PROCESSES FOR MAKING SUCH ELEMENT AND SUCH MATERIALS AND USE OF SUCH ELEMENT IN AN ELECTROCHROMIC GLASS DEVICE

This application is a continuation-in-part of application Ser. No. 07/379,225, filed Jul. 13, 1989, now U.S. Pat. No. 5,086,351.

BACKGROUND OF THE INVENTION

The present invention relates to electrochromic elements, and more particularly to laminated electrochromic glass devices and processes for making such devices.

Electrochromic materials generally are materials which change color upon application of electrical current to induce an electrochemical reaction in the material.

Electrochromic devices are known which comprise a laminated structure including an electrolyte ion conducting layer sandwiched between an electrochromic layer and a counter electrode layer, all sandwiched between a pair of conductive electrodes composed of, for example, indium-tin oxide.

Many of the prior art electrochromic elements utilize $WO_3$ as the electrochromic color-forming layer. It is known that $WO_3$ changes from a clear, transparent state to a colored state upon undergoing the reaction:

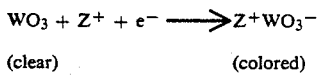

wherein Z is selected from H or alkali metals such as Li or Na.

It is also known from the nonaqueous secondary battery art that various other metals will display electrochromic properties when changing from one valence state to another. Specifically, it is known that some transition metals exhibit electrochromic properties when moving between the +2 and +3 valence states and other transition metals exhibit such properties when changing between the +3 and +4 valence states.

Heretofore, the art has had difficulty utilizing the electrochromic properties of $WO_3$ in combination with the electrochromic properties of these other known transition metal oxides. For example, it is disclosed by U.S. Pat. No. 4,750,816 that "oxidatively color-forming materials suitable as opposing electrodes of reductive color-forming layers comprising $WO_3$, etc. are not found in inorganic materials." (Column 1, lines 42-45). This is due to several factors, such as the difficulty in discovering oxidative color-forming materials which (1) have a high enough ion exchange capacity; (2) exhibit an adequate transparency or, even better, exhibit color changes complementary to those of $WO_3$; and (3) have a range of working potential compatible with that of the other materials in the electrochromic element.

The term "complementary" color changes, as used herein, means exhibiting opposite color-forming tendencies upon the insertion of an ion. $WO_3$ colors when an ion is inserted therein and thus materials "complementary" to $WO_3$ would bleach upon ion insertion. Thus, an electrochromic element utilizing a layer of $WO_3$ along with a layer of a material having a complementary color change to $WO_3$ would have two bleached electrochromic layers when an ion was inserted into the complementary layer and two colored layers when an ion was inserted into the $WO_3$ layer. This would enable an additive color effect to be attained.

Because of the aforementioned difficulties, prior art electrochromic devices tended to utilize either a single electrochromic layer of $WO_3$ or other electrochromic material to produce the desired electrochromic color change effect, or utilized either an inorganic compound which undergoes little or no color change upon ion insertion and removal or an organic compound as the opposing or counter electrode to the $WO_3$ layer. The use of a single electrochromic layer of $WO_3$ or a layer of $WO_3$ in conjunction with a counter electrode which remains transparent upon ion insertion and removal, suffers from the disadvantage that the difference in the amount of light that is transmitted through the layer in the clear and colored states is limited by the extent of color change of the $WO_3$ material. In addition, electrochromic devices utilizing an organic electrochromic layer suffer from the disadvantage that these layers are unstable over long periods of time and thus their long term color-forming durability is questionable.

It is an object of the present invention to provide a novel electrochromic element.

It is another object of the present invention to provide a novel electrochromic glass device.

It is another object of the present invention to provide an electrochromic element which is characterized by having a large difference between the percentage of visible light transmitted by the element in the colored state and the percentage of visible light transmitted by the element in the bleached state.

It is another object of the present invention to provide an electrochromic element which is characterized by having a large difference between the percentage of radiant heat transmitted by the element in the colored state and the percentage of radiant heat transmitted by the element in the bleached state.

It is another object of the present invention to provide an electrochromic element whose color-forming properties exhibit excellent long term durability.

It is another object of the present invention to provide an electrochromic element characterized by having an excellent response time, i.e., the period of time to change between the bleached state and the colored state is low.

It is another object of the invention to provide an electrochromic element that can operate effectively over a wide range of temperatures.

It is a further object of the invention to provide an electrochromic element that does not utilize toxic or corrosive materials.

It is another object of the present invention to provide an element that can operate effectively as a supercapacitor.

Additional objects and advantages of the invention will be set forth in part in the description which follows, and in part will be obvious from the description, or may be learned by practice of the invention.

SUMMARY OF THE INVENTION

As embodied and broadly described herein, the electrochromic element of the present invention can be a five-layered structure which comprises a pair of electrodes at least one of which is transparent, first and second inorganic electrochromic layers interposed between the pair of electrodes and an ion conducting layer of an electrolyte interposed between the first and second inorganic electrochromic layers. The second inorganic electrochromic layer is amorphous. The first and second inorganic electrochromic layers are preferably composed of different materials each of which is capable of exhibiting electrochromic properties upon the incorporation of at least one ion of an element selected from the group consisting of H, Li, Na, K, Ag, Cu and Tl. In addition, the electrochromic properties of the first and second inorganic electrochromic layers are preferably complementary to one another.

The electrochromic element of the invention, as embodied and broadly described herein, more particularly has a first inorganic electrochromic layer which is preferably $WO_3$ and a second inorganic electrochromic layer which is amorphous, preferably comprising a fourth period transition element chalconide or halide which exhibits a color change when shifting between the +2 and +3 or between the +3 and +4 valence states. The fourth period transition metal can be Ni, Co, Mn, Cr, V, Ti or Fe. The chalconide or halide can be O, S, F or Cl.

In another aspect of the invention, as embodied and broadly described herein, an amorphous electrochromic material is provided which may be utilized as the second inorganic electrochromic layer in the electrochromic element of the invention. This material comprises a transition element chalconide or halide which exhibits a color change when shifting between the +2 and +3 valence states or between the +3 and +4 valence states and can be represented by the formula $M_x T^n_y T^{n+m}_{(uz-ny-x)/(n+m)} X^u_z$. M is at least one element selected from H, Li, Na, K, Ag, Cu and Tl. T is a transition element of the fourth period of the periodic table having an oxidation number ranging from 2 to 4. T can be Ni, Co, Mn, Cr, V, Ti or Fe. X is at least one element selected from O, S, F and Cl. n, n+m and u are oxidation numbers. x is the moles of $M^+$ ions that are incorporated into the electrochromic material, y is the moles of T at the oxidation number n and z is the moles of X. x, y, z, $u \geq 0$, $2 \leq n \leq 3$, $1 \leq m \leq 2$, $n+m \leq 4$.

The electrochromic element of the invention utilizing the above amorphous electrochromic material as the second inorganic electrochromic layer is capable of exhibiting a first color state wherein the first inorganic electrochromic layer is bleached and has the composition $WO_3$ and the second inorganic electrochromic layer is bleached and has the composition $M_x T^n_y X^u_z$, and a second color state wherein the first inorganic electrochromic layer is colored and has the composition $M_{\Delta x} WO_3$ and the second inorganic electrochromic layer is colored and has the composition $M_{x-\Delta x} T^n_{y-\Delta x/m} T^{n+m}_{\Delta x/m} X^u_z$. The first color state has a maximum transmissivity and the second color state has a less than maximum transmissivity. The formula $M_x T^n_y T^{n+m}_{(uz-ny-x)/(n+m)} X^u_z$ represents intermediate insertion states.

In another aspect of the invention, as embodied and broadly described herein, an electrochromic element is provided which comprises a plurality of five-layered electrochromic elements as described above, positioned in juxtaposed surface to surface relation with one another, each pair of five-layered elements separated by a substrate layer. More specifically, a device comprising a pair of five-layered elements comprises the following layers, in order: a first transparent substrate; a first transparent conductive electrode; a first inorganic electrochromic layer; a first ion conducting layer of an electrolyte; a first amorphous inorganic electrochromic counter electrode layer; a second transparent conductive electrode; a second transparent substrate; a third transparent conductive electrode; a second amorphous inorganic electrochromic counter electrode layer; a second ion conducting layer of an electrolyte; a second inorganic electrochromic layer; a fourth conductive electrode which may be transparent or reflective; and a third transparent substrate. The first and second inorganic electrochromic layers are preferably different from the first and second amorphous inorganic electrochromic counter electrode layers. The first and second inorganic electrochromic layers and the first and second amorphous electrochromic counter electrode layers are preferably capable of exhibiting electrochromic properties upon the incorporation of an ion of an element selected from H, Li, Na, K, Ag, Cu and Tl. In addition, the electrochromic properties of the first and second inorganic electrochromic layers preferably are complementary to the electrochromic properties of the first and second amorphous inorganic electrochromic counter electrode layers.

The invention also relates to processes for making the amorphous electrochromic materials described above. As embodied and broadly described herein, one such process for producing an amorphous electrochromic material comprises:

A first step of forming an original thin film consisting essentially of TO, $T(OH)_2$ and TOOH by sputtering a target comprising T with $O_2/H_2$ plasma;

a second step of electrochemically processing the original thin film in alkali metal hydroxide solution to give a layer consisting essentially of TO and TOOH;

a third step of electrochemically processing the layer consisting essentially of TO and TOOH in a liquid electrolyte comprising an ionizable salt MZ and a polar solvent of this salt, wherein M is an element selected from H, Li, Na, K, Ag, Cu and Tl and Z is a strong acid anion selected from $ClO_4^-$, $CF_3SO_3^-$ and $N(CF_3SO_2)_2^-$, to incorporate $xM^+$ ions into the layer to form an amorphous electrochromic material having the composition $M_x T^n_y T^{n+m}_{(2z-ny-x)/(n+m)} O_z$;

wherein T is a transition element of the fourth period of the periodic table having an oxidation number ranging from 2 to 4 and is selected from Ni, Co, Mn, Cr, V, Ti and Fe; M is at least one Group 1A, 1B or 3B element selected from H, Li, Na, K, Ag, Cu and Tl; n and n+m represent oxidation numbers and x, y and z represent the moles of M, moles of T at oxidation number n and moles of O, respectively.

Another process for producing an amorphous electrochromic material, as embodied and broadly described herein, comprises:

a first step of sputtering a target of $M_\alpha T_{1-\alpha} O$, wherein $0 \leq \alpha \leq 1.0$, to form a thin film which comprises $M, T^n, T^{n+m}$ and O;

a second step of electrochemically processing the thin film in a liquid electrolyte comprising an ionizable salt MZ and a polar solvent of this salt, wherein M is an element selected from H, Li, Na, K, Ag, Cu and Tl and Z is a strong acid anion selected from $ClO_4^-$, $CF_3SO_3^-$ and $N(CF_3SO_2)_2^-$, to incorporate $M^+$ ions in the thin film to form an amorphous electrochromic material having the composition $M_x T^n_y T^{n+m}_{(2z-ny-x)/n+m} O_z$;

wherein T is a transition element of the fourth period of the periodic table having an oxidation number ranging from 2 to 4 and is selected from Ni, Co, Mn, Cr, Ti and Fe; M is at least one element selected from H, Li, Na, K, Ag, Cu and Tl; and n and n+m represent oxidation numbers; and x, y, and z represent mole fractions.

The invention also relates to a method of forming an amorphous inorganic electrochromic material. This method comprises:

sputtering a layer of a conductive electrode material on a first substrate;

sputtering a layer of an amorphous inorganic electrochromic material onto said conductive electrode layer on said first substrate;

depositing a solid polymer electrolyte onto said amorphous inorganic electrochromic layer;

assembling a lithium electrode on a second substrate into juxtaposed contact with said solid polymer electrolyte;

applying a first voltage differential between said conductive electrode material and said lithium electrode to incorporate lithium ions into said amorphous inorganic electrochromic layer;

applying a second voltage differential between said conductive electrode material and said lithium electrode to remove lithium ions from said amorphous inorganic electrochromic layer; and removing said lithium electrode on said second substrate and said solid polymer electrolyte from said amorphous inorganic electrochromic layer.

The invention also relates to a method of manufacturing the electrochromic device as described above. This method, as embodied and broadly described herein, preferably comprises:

sputtering a layer of a conductive electrode material on a first substrate;

sputtering a layer of an inorganic electrochromic material onto the conductive electrode layer on the first substrate;

sputtering a layer of a conductive electrode material on a second substrate;

sputtering a layer of an amorphous inorganic electrochromic material onto the conductive electrode layer on the second substrate; and assembling an ion conducting layer of an electrolyte between the sputtered sides of the first and second substrates.

The invention further relates to a method of manufacturing the electrochromic device comprising a pair of five-layered electrochromic elements in back to back relation. Such a method, as embodied and broadly described herein, comprises:

sputtering a first layer of a conductive electrode material on a first substrate;

sputtering a first layer of an inorganic electrochromic material onto the first conductive electrode layer on the first substrate;

sputtering a second layer of a conductive electrode material on a second substrate;

sputtering a second layer of an inorganic electrochromic material onto the second conductive electrode layer on the second substrate;

sputtering a third layer of a conductive electrode material on one side of a third substrate and a fourth layer of a conductive electrode material on the other side of the third substrate; and sputtering a layer of an amorphous inorganic electrochromic material on the third and fourth conductive electrode layers on each side of the third substrate. The sputtered side of the first substrate is assembled into juxtaposed contact with one side of the third substrate with an ion conducting layer of an electrolyte interposed therebetween. The sputtered side of the second substrate is then assembled into juxtaposed contact with the other side of the third substrate with an ion conducting layer of an electrolyte interposed therebetween.

The present invention also provides a supercapacitor comprising a pair of conductive substrates, first and second inorganic electrochromic layers interposed between the pair of conductive substrates and an ion conducting layer of an electrolyte interposed between the first and second inorganic electrochromic layers.

The accompanying drawings, which are incorporated in and constitute a part of this specification, illustrate preferred embodiments of the invention and together with the detailed description of the preferred embodiments herein, serve to explain the principles of the invention.

BRIEF DESCRIPTION OF THE DRAWINGS

FIG. 1 is a sectional view showing a construction of one embodiment of the laminate electrochromic device of the present invention.

FIG. 2 is a sectional view showing a construction of a second embodiment of the laminate electrochromic device of the invention.

DESCRIPTION OF THE PREFERRED EMBODIMENTS

Reference will now be made in detail to the present preferred embodiments of the invention, examples of which are illustrated in the accompanying drawings.

In accordance with the present invention, there is provided an electrochromic element comprising a pair of electrodes at least one of which is transparent, first and second inorganic electrochromic layers interposed between the pair of conductive electrodes and an ion conducting layer of an electrolyte interposed between the first and second inorganic electrochromic layers. The second inorganic electrochromic layer is amorphous. As used herein, the term amorphous means amorphous to X-rays. The first inorganic electrochromic layer can be amorphous or crystalline. The first and second inorganic electrochromic layers are different and are capable of exhibiting electrochromic properties upon the incorporation of an ion of an element selected from H, Li, Na, K, Ag, Cu and Tl. The electrochromic properties of the first and second inorganic electrochromic layers are complementary. As embodied in FIG. 1, electrochromic element 10 comprises a pair of conductive electrodes 12 and 14. Conductive electrodes 12 and 14 may both be transparent or one may be transparent and the other reflective.

In a preferred embodiment of the invention, electrochromic element 10 is utilized in an electrochromic glass device. In such an embodiment, conductive electrodes 12 and 14 are both transparent and are formed on two substrates 22 and 24 made of, for example, glass or plastic. Conductive electrodes 12 and 14 may be any of those materials known in the art to be useful as transparent conductive electrodes and are preferably composed of indium tin oxide, which is a composition of $In_2O_3$ containing 5 wt. % of $SnO_2$, or fluorine doped tin oxide ($SnO_2$:F). When utilizing indium tin oxide as conductive electrodes 12 and 14, the indium tin oxide is preferably deposited on float glass. Pyrolytic glass ($SnO_2$:F)

as supplied by the glass industry may also be utilized, which would function as both conductive electrodes 12 and 14 and substrates 22 and 24.

In another embodiment of the invention, electrochromic element 10 is utilized in a mirror. In such an embodiment, one of conductive electrodes 12 and 14 is reflective and the other is transparent. The conductive electrode 12 or 14 that is reflective may be any of those materials known in the art to be useful as reflective conductive electrodes, such as Al, Au or Ag.

In accordance with the present invention as embodied in FIG. 1, first inorganic electrochromic layer 16 and second inorganic electrochromic layer 18 are interposed between conductive electrodes 12 and 14. First inorganic electrochromic layer 16 preferably comprises $WO_3$. $WO_3$ is bleached in its normal state and is thus transparent. However, the compound $WO_3$ has the property that it exhibits a colored state when ions such as $Li^+$ are incorporated therein. First inorganic electrochromic layer 16 may alternatively comprise $TiO_2$ or $MoO_3$, or any of those compounds known in the art that are bleached in the normal state and colored when ions such as $H^+$, $Li^+$, $Na^+$, $K^+$, $Ag^+$, $Cu^+$, and $Tl^+$ are incorporated therein.

In accordance with the invention, first inorganic electrochromic layer 16 may be produced by sputtering a tungsten target to form a film of $WO_3$ or alternatively, the film of $WO_3$ may be electrochemically processed.

In accordance with the invention, second inorganic electrochromic layer 18 preferably comprises a fourth period transition element chalconide or halide having the property of exhibiting a color change when shifting between the +2 to +3, or between the +3 and +4 valence states. The composition of second inorganic electrochromic layer 18 can be represented by the formula $M_x T^n_y T^{n+m}_{(uz-ny-x)/(n+m)} X^u_z$. T is a transition element of the fourth period of the periodic table which can be Ni, Co, Mn, Cr, V, Ti or Fe, and M is at least one element selected from H, Li, Na, K, Ag, Cu and Tl. X can be O, S, F or Cl. n, n+m and u represent oxidation numbers. x represents the moles of $M^+$ ions that are incorporated into second inorganic electrochromic layer 18. y represents the moles of T at the oxidation number n and z is the moles of x. x, y, z, $u \geq 0$, $2 \leq n \leq 3$, $1 \leq m \leq 2$, $n+m \leq 4$.

In accordance with the invention, Li, Na, K, Ag, Cu or Tl ions can be incorporated into first and second inorganic electrochromic layers 16 and 18 without any incorporation of $H^+$ ions. However, during assembly of electrochromic element 10, it is possible that some amount of water may enter the system. The presence of water in the electrochromic system may cause certain amounts of $H^+$ ions to be formed which will inevitably become incorporated into first and second inorganic electrochromic layers 16 and 18 along with $Li^+$, $Na^+$, $K^+$, $Ag^+$, $Cu^+$ or $Tl^+$ ions. The presence of $H^+$ ions in the system can cause problems in that $WO_3$ degrades in the presence of $H_2O$, which may be formed as a by-product. In addition, $H_2$ gas may be formed as a by-product from $H^+$ ions and can cause bubble formation (often called "outgassing"). On the other hand, $H^+$ ions are smaller than $Li^+$, $Na^+$, $K^+$, $Ag^+$, $Cu^+$ or $Tl^+$ ions and thus are more mobile which results in faster incorporation and extraction from first and second inorganic electrochromic layers 16 and 18. A mixture of Li, Na, K, Ag, Cu or Tl and hydrogen ions incorporated into first and second inorganic electrochromic layers 16 and 18 will have some of the characteristics of both $H^+$ incorporation and non-hydrogen $M^+$ incorporation.

In accordance with the invention, second inorganic electrochromic layer 18 may be produced by an electrochemical method of first sputtering a target comprised of a transition metal T with a plasma of $O_2/H_2$ to form an original thin film layer consisting essentially of a mixture of TO, $T(OH)_2$ and TOOH. This original layer is then preferably electrochemically processed in an alkali metal hydroxide solution, for instance NaOH, 1N solution, wherein the original layer is the cathode and the anode is a platinum electrode. This electrochemical step yields a layer consisting essentially of TO and TOOH. The resulting layer is then electrochemically processed in a liquid electrolyte solution with one electrode consisting of the TO/TOOH mixture with an opposing lithium electrode. The liquid electrolyte may comprise an ionizable salt MZ and a polar solvent of this salt, such as propylene carbonate and $(C_2H_5)_2NSO_2N(C_2H_5)_2$, wherein M is as defined earlier herein and Z is a strong acid anion selected from $ClO_4^-$, $CF_3SO_3^-$ and $N(CF_3SO_2)_2^-$. The electrochemical reaction that takes place causes a particular mole fraction of $M^+$ ions, designated herein as x, to become incorporated into the layer in a first stage. This electrochemical reaction is designated by the following equation:

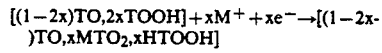

$$[(1-2x)TO, 2xTOOH] + xM^+ + xe^- \rightarrow [(1-2x)TO, xMTO_2, xHTOOH]$$

While not intending to be bound by any theory of how the invention works, applicants believe that the H atoms in TOOH are loosely attached and may migrate into the interior of the layer. It is believed that, in a first stage, some amount of $M^+$ ions are immediately incorporated into the electrochromic layer and a solid solution is spontaneously formed which comprises M, $T^n$, $T^{n+m}$ and O. This first stage incorporation of $M^+$ ions is partially irreversible.

In addition to the $M^+$ ions that can be incorporated into the electrochromic layer in a first stage, an additional amount of $M^+$ ions can be incorporated into the electrochromic layer in a second stage. This second stage incorporation is reversible, which enables the ions to be inserted and removed from the layer.

The present invention utilizes the property of transition elements such as Ni, Co, Mn, V and Fe that undergo a color change when moving between the +2 and +3 valence states and the property of transition elements such as Fe, Ti and Cr that undergo a color change when moving between the +3 and +4 valence states. Generally, Ni, Co, Mn, and V are colored in the +3 valence state and bleached (less colored in the case of Co) in the +2 valence state. Cr and Fe are generally bleached in the +3 state and colored in the +4 state. Ti generally exhibits only a small color change when moving between the +3 and +4 valence states and thus Ti based compounds could also be utilized as first inorganic electrochromic layer 16.

In accordance with the invention, an alternative method for producing second inorganic electrochromic layer 18 is a physical preparation which comprises a first step of sputtering a target of $M_aT_{1-a}O$, wherein $0 < a \leq 1.0$ and w represent mole fraction, to form a thin film which comprises M, $T^n$, $T^{n+m}$ and O; and a second step of electrochemically processing the thin film in a liquid electrolyte comprising a polar solvent selected from propylene carbonate and $(C_2H_5)_2NSO_2N(C_2H_5)_2$ and an ionizable salt MZ, wherein M is an element selected from H, Li, Na, K, Ag, Cu and Tl and Z is a strong acid anion selected from $ClO_4^-$, $CF_3SO_3^-$ and $N(CF_3SO_2)_2^-$, to incorporate $xM^+$ ions into the thin film to form the electrochromic material having the composition $M_xT^n{}_yT^{n+m}{}_{(2z-ny-x)/(n+m)}O_z$.

In accordance with the invention, an alternative method for producing either first or second inorganic electrochromic layers 16 or 18 is a method that consists of chemically inserting atoms such as lithium or silver atoms into either layer. This chemical insertion can be achieved by using alkali metal active organic solutions similar to those utilized to intercalate $Li^+$ ions in various host structures. (See French Patent No. 2,569,058). This method overcomes the potential problem of $H^+$ contamination since protons are incapable of co-existing with Li, Na, K, Ag, Cu or Tl in these solutions.

In accordance with the invention, an amorphous inorganic electrochromic material can be produced by inserting and extracting lithium ions prior to assembling the device without the use of any liquid electrolyte. This "solid state" process enables an amount of ions to be inserted in addition to the amount inserted into the deposited films. It has been found that this process provides the following advantages: improved reversibility of ion exchange; avoidance of liquid electrolyte diffusion into the other layers of the device; and capability of cycling the device at elevated temperatures which reduces the processing time and stabilizes the layers.

In accordance with the invention, the "solid state" process for forming the electrochromic layer comprises forming an "electrochromic layer laminate" which consists of: substrate/transparent conductive electrode/electrochromic layer/solid polymer electrolyte (SPE). The solid polymer electrolyte may be cross-linked and should be a material that is conductive to $Li^+$. A lithium electrode on a substrate is then placed into juxtaposition with the electrochromic layer laminate. This can be accomplished by: (1) applying a lithium foil to the electrolyte layer of the electrochromic layer laminate; (2) forming a solid polymer electrolyte/lithium/substrate laminate ("lithium laminate") and contacting the SPE of the electrochromic layer laminate with the SPE of the lithium laminate under pressure in a vacuum; or (3) forming a lithium laminate and adhering the SPE of the lithium laminate with the SPE of the electrochromic layer laminate with a small amount of additional SPE acting as a crosslinkable adhesive.

The resulting device, which consists of substrate/transparent conductive electrode/electrochromic layer/SPE/lithium/substrate, is then "cycled" by application of a voltage differential to first insert and then remove $Li^+$ from the electrochromic layer. The SPE/lithium electrode/substrate can then be removed by, for example, peeling away. The remaining substrate/conductive electrode/electrochromic layer can then be assembled in a final electrochromic device.

It has been discovered by the present inventors that, although it may be advantageous in many cases to insert and remove ions from the inorganic electrochromic material prior to assembling the electrochromic device, it may not always be necessary to do so. Thus, it may be advantageous in some cases to assemble the electrochromic device of the invention without any electrochemical processing of the inorganic electrochromic layers.

In accordance with the invention, second inorganic electrochromic layer 18 is amorphous rather than crystalline or polycrystalline. Some crystalline materials are capable of reversibly intercalating $M^+$ ions. These materials are believed to have a long range tunnel-like or leaflet-like crystal order, at least along one direction. However, such structures are very difficult to obtain in thin films by known techniques. Presently available techniques for producing thin films yield, at best, polycrystalline structures, i.e., materials having crystalline domains that are randomly connected. Polycrystalline structures have intercalation properties (exchange capacity and kinetics) that are significantly inferior to those of monocrystals. This is believed to be due to the fact that the crystallites are randomly oriented and thus there is no continuity of tunnels from one grain to the other. As a result, potential barriers to ion migration exist at the boundaries between crystallites.

The process of the present invention, on the other hand, can produce thin films that are amorphous and thus are capable of very high exchange capacities and superior kinetics, as compared to polycrystalline materials. Performance of the amorphous thin films of the present invention actually approaches that of monocrystals.

In accordance with the present invention as embodied in FIG. 1, ion conducting layer 20 is interposed between first and second inorganic electrochromic layers 16 and 18. Ion conducting layer 20 preferably consists of a solid polymeric electrolyte, which is an amorphous solid solution comprising a copolymer of ethylene oxide and methyl glycidyl ether and at least one ionizable salt. Alternatively, the copolymer may be ethylene oxide and butylene oxide. The preferred proportions of the copolymer are 75% ethylene oxide and 25% methyl glycidyl ether or butylene oxide. In addition, a small amount of allyl glycidyl ether (5%) may be included in the copolymer. The molecular weight of the copolymer preferably ranges between 30,000 and 2,000,000. The ionizable salt utilized in conjunction with the solid copolymer, can be a mixture of $MClO_4$ and $MN(CF_3SO_2)_2$ or can consist entirely of $MN(CF_3SO_2)_2$, wherein M is selected from H, Li, Na, K, Ag, Cu or Tl, and is preferably Li. The solid polymeric electrolyte may also include a plasticizer such as $(C_2H_5)_2NSO_2N(C_2H_5)_2$. (See French Patent No. 2,606,216).

In accordance with an alternative embodiment of the invention, ion conducting layer 20 may comprise a polyurethane made by reacting triisocyanates with the above-mentioned copolymers having a low molecular weight (1,000–20,000) along with at least one of the above-mentioned ionizable salts. Such a polyurethane network utilized in ion conducting layer 20 chemically crosslinks and hardens at temperatures near room temperature. The basic chemical reaction is:

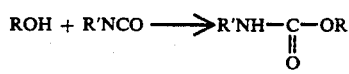

These polyurethane networks have the advantage of nearly perfect optical transparency.

In accordance with the invention, the ion conducting layer 20 may also utilize a liquid electrolyte such as $LiClO_4$-propylene carbonate. However, a solid polymeric electrolyte for use in ion conducting layer 20 is preferable over liquid electrolytes because the solid polymers are much easier to handle in assembling the electrochromic device and present far fewer safety concerns in the assembled device from potential leaking. One important factor which can cause "haze" problems in electrochromic elements is the crystallization of the ion conducting layer. The solid polymeric electrolyte of the invention comprising a copolymer of ethylene oxide and methyl glycidyl ether or butylene oxide along with at least one ionizable salt and the solid polymeric electrolyte comprising a polyurethane gel and at least one ionizable salt each provides an efficient layer for conducting ions between first and second inorganic electrochromic layers 16 and 18 without significant crystallization of the solid polymer electrolyte, i.e., the solid polymer electrolyte remains amorphous. In addition, the copolymer including butylene oxide has the advantage of being less hydrophilic.

The ion conducting macromolecular material of the present invention can broadly be any polymer-based material exhibiting an ionic conductivity at least equal to $10^{-7}$ siemens/cm at room temperature and an electronic conductivity lower than $10^{-10}$ siemens/cm.

In particular, the ion conducting macromolecular material can comprise a solid solution of at least one ionizable salt, especially a Group 1A, 1B or 3B element salt and more particularly a lithium salt, in a plastic polymeric material comprising at least in part one or more polymers and/or copolymers of monomers containing at least one heteroatom, especially oxygen or nitrogen, able to form donor/acceptor bonds with the cation of the ionizable salt, the polymers being in particular, chosen among polyethers, and more especially among the polymers of ethylene oxide or propylene oxide (see European Patent Application No. 0013199). The plastic polymeric material can comprise at least one copolymer of ethylene oxide and of another cyclic oxide, said copolymer having either the structure of a statistical copolymer (U.S. Pat. No. 4,578,326) which may be crosslinked (French Patent No. 2,570,224) or the form of a polyurethane network resulting from the reaction of a sequenced copolymer of ethylene oxide and another cyclic oxide with a coupling agent consisting of an organic polyisocyanate (French Patent No. 2,485,274). Moreover, the ionizable salts mentioned in European Patent Application No. 0013199 can be replaced in whole or in part by ionizable salts such as alkali metal closoboranes (French Patent No. 2,523,770), alkali metal tetrakis-trialkylsiloxyalanates (French Patent No. 2,527,611), alkali metal bis(perhalogenoalkylsulfonyl)imides or bis(perhalogenoacyl)imidides (French Patent No. 2,527,602), alkali metal tetraalkynylborates or aluminates (French Patent No. 2,527,610), alkali metal derivatives of perhalogenoalkylsulfonylmethane or perhalogenoacetylmethane (French Patent No. 2,606,218), or alkali metal salts of polyethoxylated anions (European Patent Application No. 0,213,985).

The ion conducting macromolecular material of the invention can also broadly consist of a solid solution of an ionizable salt, for example one of those mentioned above, in a polymeric material made up with an organometallic polymer in which at least two polyether chains are linked by a metallic atom selected from Al, Zn and Mg (French Patent No. 2,557,735) or among Si, Cd, B and Ti (French Patent No. 2,565,413), or in a polymeric material consisting of a polyphosphazene bearing on each phosphorus atom two polyether groups such as polyethylene oxide groups. The ion conducting macromolecular material may also be selected from the mixtures of polymers having a solvating and/or polar character with any salt, acid or base sufficiently dissociated in the polymer to obtain the appropriate conductivity, from polymers bearing ionizable functions resulting in anions or cations attached to the macromolecular chains, from protonic conductors such as those described in French Patent No. 2,593,328 or mixtures of inert polymers with mineral or organic ion conducting materials dispersed in the polymer matrix.

In a preferred embodiment of the present invention, electrochromic element 10 is interposed between a pair of glass or plastic substrates 22 and 24. Such an arrangement forms an electrochromic device. The electrochromic device can be manufactured by sputtering on a glass or plastic substrate 22 or 24, conductive electrode 12 which may be composed of indium-tin oxide or fluorine doped tin oxide ($SnO_2$:F). First inorganic electrochromic layer 16 is then sputtered onto conductive electrode 12. On a second glass or plastic substrate 22 or 24, conductive electrode 14 is sputtered, and second inorganic electrochromic layer 18 is sputtered onto conductive electrode 14. The two sputtered glass substrates are then assembled with ion conducting layer 20, which may be a solid polymeric electrolyte, interposed therebetween.

In accordance with the invention, it should also be possible to manufacture electrochromic element 10 by depositing all of the active layers, i.e., conductive electrodes 12 and 14, first and second inorganic electrochromic layers 16 and 18 and ion conducting layer 20 in the form of a gel. (See Solid State Ionics 28-30 (1988)-1722).

In accordance with the invention, $M^+$ ions can be incorporated into first inorganic electrochromic layer 16 prior to being assembled in the electrochromic element 10. Alternatively, $M^+$ ions can be incorporated into second inorganic electrochromic layer 18 prior to assembly into the electrochromic device. In either case, the application of a voltage differential between conductive electrodes 12 and 14 will cause the $M^+$ ion to move out of one inorganic electrochromic layer 16 or 18, through ion conducting layer 20 and into the other inorganic electrochromic layer 16 or 18, thereby causing each of first and second inorganic electrochromic layers 16 and 18 to become either bleached or colored.

In accordance with the invention, the voltage differential between conductive electrodes 12 and 14 sufficient to cause $M^+$ ions to be incorporated into either first or second inorganic electrochromic layers 16 and 18 is less than or equal to 3.5 volts vs. Li. This makes first and second inorganic electrochromic layers 16 and 18 compatible with ion conducting layer 20 when utilizing a solid polymeric electrolyte containing a lithium salt which will decompose at potentials greater than or equal to 3.5 volts vs. Li.

In an alternative embodiment of the invention, as embodied in FIG. 2, electrochromic element 28 comprises:
a first transparent conductive electrode 30 which may be indium tin oxide or fluorine doped tin oxide;
first inorganic electrochromic layer 32 which may be $WO_3$, $MoO_3$ or $TiO_2$;
first ion conducting layer of an electrolyte 34 which may be a solid polymeric electrolyte comprising a terpolymer of ethylene oxide, butylene oxide and allyl glycidyl ether and at least one ionizable salt or may be a solid polymeric electrolyte comprising a polyurethane gel and at least one ionizable salt;

first amorphous inorganic electrochromic counter-electrode layer 36 which may be the same transition element compounds as disclosed earlier for second inorganic electrochromic layer 18 of FIG. 1;

second transparent conductive electrode 38 which may be indium tin oxide or fluorine doped tin oxide;

transparent substrate 40 which may be glass or a plastic;

third transparent conductive electrode 42 which may be indium tin oxide or fluorine doped tin oxide;

second amorphous inorganic electrochromic counter-electrode layer 44 which may be the same transition element compounds as disclosed earlier for second inorganic electrochromic layer 18 of FIG. 1;

second ion conducting layer of an electrolyte 46 which may be the same materials as for layer 34;

second inorganic electrochromic layer 48 which may be $WO_3$, $MoO_3$ or $TiO_2$;

and fourth conductive electrode 50 which may be transparent or reflective.

First and second inorganic electrochromic layers 32 and 48 are preferably different from first and second amorphous inorganic electrochromic counter-electrode layers 36 and 44. First and second inorganic electrochromic layers 32 and 48 and first and second amorphous inorganic electrochromic counter-electrode layers 36 and 44 are preferably capable of exhibiting electrochromic properties upon the incorporation of an ion such as those mentioned earlier herein. The electrochromic properties of first and second inorganic electrochromic layers 32 and 48 are preferably complementary to the electrochromic properties of first and second amorphous inorganic electrochromic counter-electrode layers 36 and 44. Within the scope of the present invention, electrochromic element 28 may be interposed between two layers of transparent substrate materials 22 and 24, such as glass or plastic.

In accordance with the invention, electrochromic element 28 can be manufactured by sputtering a layer of a conductive electrode material on a first transparent substrate 22 or 24 to form first transparent conductive electrode 30 followed by sputtering a layer of a first inorganic electrochromic material onto first transparent conductive electrode 30 to form first inorganic electrochromic layer 32. Similarly, fourth conductive electrode 50 and second inorganic electrochromic layer 48 can be formed on a second glass substrate 22 or 24. A third glass substrate 40 can be sputtered with second transparent conductive electrode 38 and first amorphous inorganic electrochromic counter-electrode layer 36 on one side and sputtered with third transparent conductive electrode 42 and second amorphous inorganic electrochromic counter-electrode layer 44 on the other side. First ion conducting layer of an electrolyte 34 can be assembled between the sputtered side of first glass substrate 22 or 24 and either side of third glass substrate 40. Second ion conducting layer of an electrolyte 46 can then be assembled between the sputtered side of second glass substrate 22 or 24 and the other side of third glass substrate 40 to form electrochromic element 28.

The electrochromic element of the present invention utilizing Ni as the transition metal in second inorganic electrochromic layer 18 and Li ions as the insertion ions has achieved an ion exchange of 20–25 mC/cm². The electrochromic element of the present invention has been shown to be durable over more than 10,000 cycles in severe conditions while achieving complete bleaching and coloration at each cycle. Changes in transmissivity of the electrochromic element of the invention have been achieved ranging from 30–35% to approximately 85% of visible transmitted light when utilizing the element of FIG. 1 and also lower ranges have been achieved ranging from 3–5% to 55–60% of visible transmitted light when utilizing the element of FIG. 2. The switching time of the electrochromic element of the invention, i.e., the time to go from the colored state to the bleached state is in the range of 1–10 minutes.

The following Examples are provided to illustrate the present invention and some of its advantages. The Examples are not intended to limit the invention.

EXAMPLE 1

Manufacture of a Solid State Device

Manufacture of Transparent Conductive Electrodes (TE)

Transparent conductive electrodes consisting of ITO (Indium Tin Oxide), deposited by reactive DC sputtering from an indium tin target, were deposited on float glass (5×5 cm²) under the following conditions:

| | |
|---|---|
| Initial pressure: | $10^{-5}$ mb |
| Oxygen pressure: | $10^{-3}$ mb |
| Argon pressure: | $2.2 \cdot 10^{-3}$ mb |
| Total pressure: | $3.2 \cdot 10^{-3}$ mb |
| Power: | 400 W |
| Voltage: | 515 V |
| Sputtering time: | 10 min. |
| Annealing: | 450° C. for 30 min. |
| Properties of the films: | |
| thickness = 1600 A | |
| sheet resistance $R_o$ = 50 ohms | |
| optical transmission at 550 nm: | 90% |

Preparation of First Inorganic Electrochromic Layer EC1

$WO_3$ was prepared by reactive DC sputtering from a tungsten target under the following conditions:

| | |
|---|---|
| Initial pressure: | $10^{-5}$ mb |
| Oxygen pressure: | $8 \times 10^{-3}$ mb |
| Power: | 1000 W |
| Voltage: | 490 V |
| Sputtering time: | 50 min. |

The $WO_3$ films thereby obtained can be either directly used or electrochemically processed ("formated") in $H_2SO_4$, 1N solution prior to utilization. A three electrode cell configuration was used for this processing: the electrochromic material $EC_1$, a platinum counter electrode and a saturated calomel reference electrode (SCE). The electrochemical treatment consisted first of a cathodic polarization of $EC_1$ at 0.5 V vs. SCE for 120 seconds then followed by an anodic polarization at +0.5 V vs. SCE for 120 seconds. This cycle was repeated three times and the procedure was terminated with the anodic polarization. Finally, the films were rinsed in distilled water and then dried at room temperature.

The performance of both types of thin films (straight from sputtering and formated in $H_2SO_4$) are compared in the following table (transmission measurements were carried out at 550 nm).

| | Thickness (A) | Exchanged charge (mC/cm2) | Transm. colored (%) | Transm. bleached (%) | Coloring time (min.) | Bleaching time (min.) |
|---|---|---|---|---|---|---|
| $WO_3$ (straight) | 3000 | 7 | 45 | 90 | 6 | 5 |
| $WO_3$ (formated) | 3000 | 10 | 35 | 90 | 4 | 3 |

Preparation of Second Inorganic Electrochromic Layer (EC2)

Two methods have been used:
electrochemical
physical

Electrochemical preparation involved three steps:

1st step:

The "original" layer was prepared by reactive DC sputtering from a nickel target under the following conditions:

| Initial pressure: | $10^{-5}$ mb | Power: | 300W |
|---|---|---|---|
| Oxygen pressure: | $7.2 \times 10^{-3}$ mb | Voltage: | 240V |
| Hydrogen pressure: | $0.4 \times 10^{-3}$ mb | Sputtering time: | 60 min. |
| Total pressure: | $7.6 \times 10^{-3}$ mb | Film thickness: | 1100A |

This produced a thin film consisting of a mixture of NiO, $Ni(OH)_2$ and NiOOH.

2nd step:

After sputtering, the film was electrochemically processed in NaOH, 1N, in a manner similar to that described above for $WO_3$, but with an anodic polarization vs SCE for 2 min.

This yielded the formation of a layer of NiOOH and NiO. Once formated, the film was rinsed in distilled water, then dried at room temperature.

3rd step:

The final active material, namely $Li_xNi^{2+}{}_yNi^{3+}{}_{(2z-2y-x)/3}O_z$, was obtained after an electrochemical treatment performed in a dry box. The procedure utilized a two-electrode cell configuration, namely the Ni based film and a lithium electrode; both electrodes were immersed in $LiClO_4$(1M) propylene carbonate ($LiClO_4$ p.c.). The film was then polarized at 1.7 V vs Li for 60 min. to produce the above mentioned active material $Li_xNi^{2+}{}_yNi^{3+}{}_{(2z-2y-x)/3}O_z$.

Physical preparation:

Steps 1 and 2 above were replaced by reactive direct sputtering (RF) from a $Li_{0.3}Ni_{0.7}O$ target having a 75 mm diameter.

Target manufacturing:

A mixture (powder) of $0.15 Li_2CO_3 + 0.7$ NiO (molar proportion) was first heated in air at 1000° C. for 8 hours, and then compacted at 50 tons for 10 mins. The material thereby obtained was finally sintered in air at 1000° C. for 8 hours. The conditions for the reactive RF sputtering were the following:

| Initial pressure: | $10^{-5}$ mb | Voltage: | 200V |
|---|---|---|---|
| Oxygen pressure: | $2.5 \times 10^{-2}$ mb | Sputtering time: | 120mn |
| Powder: | 30 W | Film thickness: | 1100A |

The thin film obtained by sputtering was then processed in $LiClO_4$ p.c. as the third step of the electrochemical method described above to produce the final $Li_xNi_{1-x}O$ material.

The performance of both types of Ni based thin films are compared in the following table (light transmission is measured at 550 nm).

| | Thickness (A) | Exchanged charge (mC/cm2) | Transm. colored (%) | Transm. bleached (%) | Coloring time (mn.) | Bleaching time (mn.) |
|---|---|---|---|---|---|---|
| Electrochemical preparation | 1100 | 6 | 45 | 90 | 30 | 20 |
| Physical preparation | 1100 | 12 | 20 | 75 | 3 | 2 |

Preparation of the Solid Polymer Electrolyte (SPE):

The solid polymer electrolyte was a "solid solution" of a lithium salt in a copolyether type polymer. The polymer was an ethylene oxide based terpolymer comprising the following units:

75% (Wt %) ethylene oxide (OE):
—($CH_2$—$CH_2$—O)—

20% (Wt %) methyl glycidyl ether (MGE):
—($CH_2$—CH—O)—
           |
           $CH_2$—O—$CH_3$ 5% (Wt %) allyl glycidyl ether (AGE):
—($CH_2$—CH—O)—
           |
           $CH_2$—O—$CH_2$—CH=$CH_2$ An equimolar mixture of $LiClO_4$ and $LiN(CF_3SO_2)_2$ salt was dissolved in the polymer (15% wt.) to form the solid polymer electrolyte. The incorporation of the salt into the polymer was operated in air by means of a co-solvent like acetonitrile ($CH_3CN$).

The above solution (polymer + salt in $CH_3CN$) was spread (by a doctor-blade technique) onto the two electrodes (electrochromic films) at a thickness of 200 microns.

To remove the solvent and obtain a layer of solid polymer electrolyte on each substrate, they were dried at 70° C. under 12 bars pressure minimum (in air). Each SPE layer obtained was 20 microns thick.

Assembly of the Complete Device

The two parts (glass+TE+EC) were then assembled together with the SPE interposed between, in a vacuum press (0.5 mb). Prior to assembling, however, the parts were heated separately at 80° C. for 10 mins. and the air was removed out of the press chamber using a vacuum pump (0.5 mb). The parts were then pressed against each other at roughly 50 Kg/in$^2$ for 3 mins.

Finally, the device was sealed (in air) with a low vapor pressure resin in order to prevent the contamination by air and moisture.

Performance of the Complete Device

A device prepared containing the electrochemically prepared Ni based material $EC_2$ was evaluated over a number of cycles. $EC_1$ was straight $WO_3$ obtained by DC sputtering. The polymer-salt combination utilized as the ion conducting layer was the terpolymer described above.

The characteristics of the device were the following:
surface area: 20 cm$^2$
working potential range ($WO_3$ vs Ni based $EC_2$): $-1.6$ V for coloring; $+1.4$ V for bleaching
charge (Li$^+$) exchanged: 5-6 mC/cm$^2$
number of cycles: over 2000
maximum transmission changes at 550 nm:

33%→85% times to achieve the transmission changes:

| Transmission %: | 85 | 35 | 78 | 40 | 73 | 45 |
|---|---|---|---|---|---|---|
| Time (min.): | 5 | 12 | 3 | 7 | 2 | 4 |
| % of total transmission change: | 100% | | 90% | | 80% | |

EXAMPLE 2

The preparation of this system was identical to that of Example 1 except that the solid polymer electrolyte was a polyurethane network made by reacting an aliphatic triisocyanate with an $\alpha-\omega$ hydroxylated low molecular weight (Mw=10,000) copolymer comprising 75% ethylene oxide and 25% methyl glycidyl ether. The characteristics of this device were:
maximum transmission changes at 550 nm

35%→83% number of cycles: over 3,000
times to achieve the transmission changes:

| Transmission %: | 83 | 35 | 76 | 38 |
|---|---|---|---|---|
| Time (min.): | 5 | 12 | 2 | 4 |
| % of total transmission change: | 100% | | 80% | |

EXAMPLE 3

The preparation of this system was identical to that of Example 1, except that the electrolyte was a liquid electrolyte made up with a solution of LiClO$_4$ (1M) in propylene carbonate and $EC_2$ was physically prepared. The two electrodes (Physical Ni based $EC_2$ and $WO_3$) were assembled against each other with a plastic spacer in between and the system was then filled up by the liquid electrolyte.

The characteristics of this device were:
surface area: 20 cm$^2$
working potential range: $-0.8$ V for coloring, $+1.9$ V for bleaching
charge (Li$^+$) exchanged: 5 mC/cm$^2$
number of cycles: over 250
maximum transmission changes: 10%→58%
times to achieve the transmission changes:

| Transmission %: | 58 | 10 | 46 | 12 |
|---|---|---|---|---|
| Time (min.): | 3.5 | 5 | 2.3 | 1.5 |
| % of total transmission change: | 100% | | 80% | |

EXAMPLE 4

The preparation of this system was identical to that of Example 1, except for the nature of the electrolyte.

In this Example, the Ni based $EC_2$ was an "electrochemically prepared $EC_2$." The solid polymer electrolyte was a "solid solution" of a lithium salt in a copolyether type polymer. The polymer was an ethylene oxide based terpolymer comprised of:

75% (Wt %) ethylene oxide (OE)
—(CH$_2$—CH$_2$—O)—

20% (Wt %) butylene oxide (BO)
—(CH$_2$—CH—O)—
      |
     CH$_2$—CH$_3$

5% (Wt %) allylglycidyl ether (AGE)
—(CH$_2$—CH—O)—
      |
     CH$_2$—O—CH$_2$—CH=CH$_2$ The lithium salt was Li N(CF$_3$SO$_2$)$_2$, incorporated in the polymer at 20% (wt.).

The characteristics of the devices were:
surface area: 20 cm$^2$
working potential range: $-1.6$ V for coloring, $+1.4$ V for bleaching
charge (Li$^+$) exchanged: 5 mC/cm$^2$
number of cycles: over 300
maximum transmission changes: 40%→80%
times to achieve the transmission changes:

| Transmission %: | 80 | 40 | 65 | 33 |
|---|---|---|---|---|
| Time (min.): | 5 | 10 | 2 | 4 |
| % of total transmission change: | 100% | | 80% | |

EXAMPLE 5

The preparation of this system was identical to that of Example 1 except for the transparent conductive electrodes, the Ni based $EC_2$ and the solid polymer electrolyte. In this Example, the Ni based $EC_2$ was an "electrochemically prepared $EC_2$." The transparent conductive electrodes were SnO$_2$: F (fluorine doped tin oxide) prepared by chemical vapor deposition. The solid polymer electrolyte was a "solid solution" of a lithium salt in a copolyether type polymer. The polymer was an ethylene oxide based copolymer comprised of:

75% (Wt %) ethylene oxide (OE)

-continued

—(CH$_2$—CH$_2$—O)—

25% (Wt %) butylene oxide (BO)

—(CH$_2$—CH—O)—
          |
          CH$_2$—CH$_3$

An equimolar mixture of LiClO$_4$ and LiN(CF$_3$SO$_2$)$_2$ salt was dissolved in the polymer (15% wt.) to form the solid polymer electrolyte.

The characteristics of the device were:
surface area: 20 cm$^2$
working potential range: −1.6 V for coloring +1.4 V for bleaching
charge (Li+) exchanged: 5-6 mC/cm$^2$
number of cycles: over 300
maximum transmission changes: 37%→83%
times to achieve the transmission changes:

| Transmission %: | 83 | 37 | 78 | 41 |
|---|---|---|---|---|
| Time (min.): | 5 | 11 | 2 | 4 |
| % of total transmission change: |  | 100% |  | 80% |

EXAMPLE 6

A Ni based thin film EC2 was prepared by R.F. sputtering with the following parameters:
power: 120 W
initial pressure: 10$^{-7}$ mb
oxygen pressure: 8×10$^{-2}$ mb
total pressure: 8×10$^{-2}$ mb
sputtering time: 30 min.
substrate: float glass coated with SnO$_2$:F 2.5×2.5 cm$^2$
thickness: (at the edge of the substrate): 800 angstroms A film of solid polymer electrolyte (S.P.E.) was then deposited by in-situ crosslinkage, forming: glass/TE/EC2/SPE. A lithium foil was then applied to form the electrochemical cell:

glass/TE/EC2/SPE/Li/Copper.

This electrochemical cell was then cycled 50 times at voltages:

| +1.5 volt for 500 seconds (insertion of Li+ in EC2) |
| +3.5 volt for 300 seconds (extraction of Li+ from EC2) |

The charge exchanged is reported in the following table and compared to an identical sample cycled in a liquid electrolyte:

| Q (mC/cm$^2$) | cycle n°2 | cycle n°50 |
|---|---|---|
| Solid electrolyte | 26.0 | 22.0 |
| Liquid electrolyte | 24.8 | 12.4 |

After the 50 cycles, the copper/Li/SPE was removed by peeling and the glass/TE/EC2 was assembled in a final device with a WO$_3$=EC1 electrode. This device was cycled according to the voltages:

ΔV = V$_{EC1}$ - V$_{EC2}$ = −0.6V for 85 seconds (coloration)

-continued

ΔV = +1.6 volts for 45 seconds (decoloration)

and then exchanged 10.0 mC/cm$^2$ with a transmission change at λ=550 nm of 55% to 10%.

EXAMPLE 7

A chromium based EC2 film with the formula $$M_x T^n{}_y T^{n+m}{}_{(uz-ny-x)/(n+m)} X_z{}^u$$

where:
M = Li
T = Cr
n = 3
m = 1     Li$_x$Cr$^{III}{}_y$Cr$^{IV}{}_{(4-3y-x)/4}$O$_2$
X = O
u = 2
z = 2 was prepared by R.F. sputtering of a target LiCrO$_2$ with the following parameters:
Power: 100 W
Initial pressure: 10$^{-7}$mb
Argon pressure: 6×10$^{-3}$mb
Total pressure: 6×10$^{-3}$mb
Sputtering Time: 35 minutes
Thickness: 1250 Å
Substrate: float glass coated with indium tin oxide.

The film was then electrochemically processed in LiClO$_4$ (1M) in propylene carbonate solvent. It was cycled 10 times at voltages:

1.2 volts vs Lithium for 300 seconds (insertion of Li+)
3.5 volts for 600 seconds (extraction of Li+)

with a corresponding transmission change from 71% to 91%. The exchanged charge was in the vicinity of 50 mC/cm$^2$. After drying and cleaning of the film, it was assembled in a complete device identical to Example 2 (polyurethane network) with a WO$_3$ EC1 electrode.

The device was cycled according to

ΔV=V$_{EC1}$−V$_{EC2}$= −0.8 V for coloring for 380 seconds
ΔV= +1.4 volts for bleaching (at 30° C.)

with a charge exchanged of approximately 10 mC/cm$^2$ and a transmission change from 33% to 79% (at 550 nm). The number of cycles was over 4,000.

The electrochromic element of the present invention can be useful in applications such as for sun roofs of automobiles, architectural windows, aircraft windows, the rear windows of vans or trucks, or in sunglasses. The electrochromic element of the invention can be utilized to vary the amount of visible light transmitted through a substrate and also can be utilized to reduce the amount of radiant heat transmitted through windows. Alternatively, the electrochromic element of the invention can be utilized in a mirror to vary the percentage of reflected visible light which would be useful, for example, in an automobile rear view mirror.

It has also been found that the electrochromic element of the invention can be useful as a supercapacitor. Of course, the electrochromic properties of the element of the invention are not necessary in a supercapacitor. However, it has been found that a laminate consisting of an ion conducting layer of an electrolyte interposed between first and second inorganic electrochromic layers, all sandwiched between a pair of conductive substrates such as plastic sheets, having a thickness on the order of 200 microns, provides an element which is useful as a supercapacitor, having favorable values of specific capacitance, specific energy, leakage current and thermal stability. Such a laminate utilizing an ion conducting layer of an electrolyte and first and second inorganic electrochromic layers in accordance with the invention is capable of providing a specific capacitance on the order of 1 Farad/cm$^3$.

Although the present invention has been described in connection with the preferred embodiments, it is understood that modifications and variations may be resorted to without departing from the spirit and scope of the invention. Such modifications are considered to be within the purview and scope of the invention and the appended claims.

What is claimed is:

1. An electrochromic element comprising a pair of conductive electrodes at least one of which is transparent, first and second inorganic electrochromic layers interposed between said pair of conductive electrodes and an ion conducting layer of an electrolyte interposed between said first and second inorganic electrochromic layers, wherein said first and second inorganic electrochromic layers are different and are capable of exhibiting electrochromic properties upon the incorporation of at least one ion of an element selected from the group consisting of H, Li, Na, K, Ag, Cu and Tl, wherein said second inorganic electrochromic layer is amorphous, wherein the electrochromic properties of said first and second inorganic electrochromic layers are complementary, and wherein said second inorganic electrochromic layer comprises the composition $$M_x T^n_y T^{n+m}_{(uz-ny-x)/(n+m)} X^u_z,$$

wherein $x, y, z, u \geq 0$, $2 \leq n \leq 3$, $1 \leq m \leq 2$, $n+m \leq 4$; T is a fourth period transition element selected from Ni, Co, Mn, Cr, V, Ti or Fe; M is at least one element selected from H, Li, Na, K, Ag, Cu and Tl; X is selected from O, S, F and Cl; n, n+m and u are oxidation numbers; and x is the moles of M$^+$ ions incorporated into said second inorganic electrochromic layer, y is the moles of T at the oxidation number n and z is the moles of X.

2. The element of claim 1, wherein said ion conducting layer of an electrolyte is an amorphous solution of an ionizable salt in a polymer capable of conducting an amount of an ion selected from H, Li, Na, K, Ag, Cu and Tl ions between said first and second inorganic electrochromic layers sufficient to cause each of said first and second inorganic electrochromic layers to exhibit a complementary color change, with said ion conducting layer remaining amorphous and transparent.

3. The element of claim 2, wherein said first inorganic electrochromic layer is WO$_3$.

4. The element of claim 2, wherein said first inorganic electrochromic layer is MoO$_3$.

5. The element of claim 2, wherein said first inorganic electrochromic layer is TiO$_2$.

6. The element of claim 1, 2, or 3, wherein said pair of conductive electrodes are fluorine doped tin oxide (SnO$_2$:F).

7. The element of claim 1, 2, and 3, wherein said pair of conductive electrodes are indium-tin oxide.

8. The element of claim 1 or 2, wherein said ion conducting layer of an electrolyte comprises a copolymer of ethylene oxide and at least one comonomer selected from methyl glycidyl ether, propylene oxide, butylene oxide and allyl glycidyl ether, and at least one ionizable salt.

9. The element of claim 1 or 2, wherein said ion conducting layer of an electrolyte comprises:
a polyurethane gel formed by reacting a triisocyanate with an $\alpha-\omega$ hydroxylated copolymer of ethylene oxide and at least one comonomer selected from methyl glycidyl ether, propylene oxide, butylene oxide and allyl glycidyl ether, said copolymer having a molecular weight ranging between 1,000 and 20,000; and
at least one ionizable salt.

10. The element of claim 1, wherein said second inorganic electrochromic layer is formed by sputtering a target of transition metal T with an O$_2$/H$_2$ plasma to form an original layer consisting essentially of a mixture of TO, T(OH)$_2$ and TOOH; electrochemically processing the original layer in alkali metal hydroxide solution to form a layer consisting essentially of TO and TOOH; and electrochemically processing the formatted layer consisting essentially of TO and TOOH in a liquid electrolyte comprising a polar solvent and an ionizable salt of a strong acid and an element selected from H, Li, Na, K, Ag, Cu and Tl, to form said second inorganic electrochromic layer having the composition $$M_x T^n_y T^{n+m}_{(2z-ny-x)/(n+m)} O_z.$$

11. The element of claim 1, wherein said second inorganic electrochromic layer is formed by sputtering a target of M$\alpha$T$_{1-\alpha}$O, wherein $0 < \alpha \leq 1.0$, to form a thin film which comprises M, T$^n$, T$^{n+m}$ and O, electrochemically processing the thin film in a liquid electrolyte comprising a polar solvent and an ionizable salt of a strong acid and an element selected from H, Li, Na, K, Ag, Cu and Tl, to form said second inorganic electrochromic layer having the composition $$M_x T^n_y T^{n+m}_{(2z-ny-x)/(n+m)} O_z.$$

12. The element of claim 1, wherein M$^+$ ions are capable of being inserted from said ion conducting layer to said first inorganic electrochromic layer to form the composition M$_t$WO$_3$, which is colored, wherein $0 \leq t \leq 1$ and t is moles of M.

13. The element of claim 12, capable of exhibiting
a) a first color state wherein said second inorganic layer is bleached and has the composition $M_x T^n_y X^u_z$ and said first inorganic layer is bleached and has the composition WO$_3$, and b) a second color state wherein said second inorganic layer is colored and has the composition $M_{x-\Delta x} T^n_{y-\Delta x/m} T^{n+m}_{\Delta x/m} X^u_z$ and said first inorganic layer is colored and has the composition M$_{\Delta x}$WO$_3$, said first color state having a maximum transmissivity and said second color state having a less than maximum transmissivity.

14. The element of claim 1, wherein X is O.

15. The element of claim 14, wherein M is Li.

16. The element of claim 1, wherein said M$^+$ ions can be inserted into said second inorganic electrochromic layer by applying a voltage differential between said pair of conductive electrodes.

17. The element of claim 12, wherein said $M^+$ ions can be inserted into said first inorganic electrochromic layer by applying a voltage differential between said pair of conductive electrodes.

18. An electrochromic device comprising the element of claim 7 interposed between a pair of transparent substrates.

19. The electrochromic device of claim 18, wherein said pair of transparent substrates are glass.

20. The electrochromic device of claim 18, wherein said pair of transparent substrates are plastic.

21. An electrochromic element comprising the following layers, in order: a first transparent conductive electrode; a first inorganic electrochromic layer; a first ion conducting layer of an electrolyte; a first amorphous inorganic electrochromic counter electrode layer; a second transparent conductive electrode, a transparent substrate; a third transparent conductive electrode; a second amorphous inorganic electrochromic counter-electrode layer; a second ion conducting layer of an electrolyte; a second inorganic electrochromic layer and a fourth conductive electrode which may be transparent or reflective; wherein said first and second inorganic electrochromic layers are different from said first and second amorphous inorganic electrochromic counter electrode layers; said first and second inorganic electrochromic layers and said first and second amorphous inorganic electrochromic counter electrode layers are capable of exhibiting electrochromic properties upon the incorporation of ions of at least one element selected from H, Li, Na, K, Ag, Cu and Tl; and the electrochromic properties of said first and second inorganic electrochromic layers are complementary to the electrochromic properties of said first and second amorphous inorganic electrochromic counter electrode layers, and wherein at least one of said first and second inorganic electrochromic layers comprises the composition

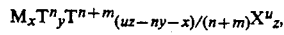

$$M_x T^n{}_y T^{n+m}{}_{(uz-ny-x)/(n+m)} X^u{}_z,$$

wherein x, y, z, $u \geq 0$, $2 \leq n \leq 3$, $1 \leq m \leq 2$, $n+m \leq 4$; T is a fourth period transition element selected from Ni, Co, Mn, Cr, V, Ti or Fe; M is at least one element selected from H, Li, Na, K, Ag, Cu and Tl; X is selected from O, S, F and Cl; n, n+m and u are oxidation numbers; and x is the moles of $M^+$ ions incorporated into said first and second inorganic electrochromic layers, y is the moles of T at the oxidation number n and z is the moles of X.

22. An electrochromic device comprising the element of claim 21 interposed between a pair of transparent substrates.

23. An amorphous electrochromic material having the formula: $M_x T^n{}_y T^{n+m}{}_{(uz-ny-x)/(n+m)} X^u{}_z$, wherein x, y, z, $u \geq 0$, $2 \leq n \leq 3$, $1 \leq m \leq 2$, $n+m \leq 4$; M is at least one element selected from H, Li, Na, K, Ag, Cu and Tl; X is selected from O, S, F and Cl; T is selected from Ni, Co, Mn, Cr, V, Ti and Fe; n, n+m and u are oxidation numbers; and x is the moles of $M^+$ ions incorporated into the amorphous electrochromic material, y is the moles of T at the oxidation number n and z is the moles of X.

24. The amorphous electrochromic material of claim 23, wherein M is Li.

25. The amorphous electrochromic material of claim 23 or 24, wherein X is O.

26. A process for producing an amorphous electrochromic material comprising:
a first step of forming an original thin film consisting essentially of a mixture of TO, T(OH)$_2$ and TOOH by sputtering a target comprising T with an O$_2$/H$_2$ plasma;
a second step of electrochemically processing the original thin film in alkali metal hydroxide solution to give a layer consisting essentially of TO and TOOH;
a third step of electrochemically processing the layer consisting essentially of TO and TOOH in a liquid electrolyte comprising a polar solvent and an ionizable salt of a strong acid and an element selected from H, Li, Na, K, Ag, Cu and Tl, to incorporate $xM^+$ ions into the layer consisting essentially of TO and TOOH to form an amorphous electrochromic material having the composition $M_x T^n{}_y T^{n+m}{}_{(2z-ny-x)/(n+m)} O_z$;
wherein T is a transition element of the fourth period of the periodic table having an oxidation number ranging from 2 to 4 and is selected from Ni, Co, Mn, Cr, V, Ti and Fe; n and n+m represent oxidation numbers; and x, y and z represent moles.

27. A process for producing an amorphous electrochromic material comprising:
a first step of sputtering a target of $M_a T_{1-a} O$, wherein $0 < a \leq 1.0$, to form a thin film which comprises M, $T^n$, $T^{n+m}$ and O;
a second step of electrochemically processing the thin film in a liquid electrolyte comprising a polar solvent and an ionizable salt of a strong acid and an element selected from H, Li, Na, K, Ag, Cu and Tl, to incorporate $M^+$ ions in the thin film to form an amorphous electrochromic material having the composition $M_x T^n{}_y T^{n+m}{}_{(2z-ny-x)/(n+m)} O_z$;
wherein T is a transition element of period four of the periodic table selected from Ni, Co, Mn, Cr, V, Ti and Fe; n and n+m represent oxidation numbers and x, y and z represent moles.

28. A process of forming the amorphous electrochromic material of claim 24 comprising:
sputtering a layer of a conductive electrode material on a first substrate;
sputtering a layer on an amorphous inorganic electrochromic material onto said conductive electrode layer on said first substrate;
depositing a solid polymer electrolyte onto said amorphous inorganic electrochromic layer;
assembling a lithium electrode on a second substrate into juxtaposed contact with said solid polymer electrolyte;
applying a first voltage differential between said conductive electrode material and said lithium electrode to incorporate lithium ions into said amorphous inorganic electrochromic layer;
applying a second voltage differential between said conductive electrode material and said lithium electrode to remove lithium ions from said amorphous inorganic electrochromic layer; and
removing said lithium electrode on said second substrate and said solid polymer electrolyte from said amorphous inorganic electrochromic layer.

29. A process of manufacturing the device of claim 18, comprising:
sputtering a layer of a conductive electrode material on a first substrate;

sputtering a layer of an inorganic electrochromic material onto said conductive electrode layer on said first substrate;

sputtering a layer of a conductive electrode material on a second substrate;

sputtering a layer of an amorphous inorganic electrochromic material onto said conductive electrode layer on said second substrate; and assembling an ion conducting layer of a solid polymeric electrolyte between the sputtered sides of said first and second substrates.

30. The process of claim 29, further comprising electrochemically processing at least one of said amorphous inorganic electrochromic material and said inorganic electrochromic material prior to assembling said ion conducting layer between said first and second substrates.

31. A process of manufacturing the device of claim 22, comprising:

sputtering a first layer of a conductive electrode material on a first substrate;

sputtering a first layer of an inorganic electrochromic material onto said first conductive electrode layer on said first substrate;

sputtering a second layer of a conductive electrode material on a second substrate;

sputtering a second layer of an inorganic electrochromic material onto said second conductive electrode layer on said second substrate;

sputtering a third layer of a conductive electrode material on one side of a third substrate and a fourth layer of a conductive electrode material on the other side of said third substrate;

sputtering a layer of an amorphous inorganic electrochromic material on said third and fourth conductive electrode layers on each side of said third substrate;

assembling the sputtered side of said first substrate into juxtaposed contact with one side of said third substrate with an ion conducting layer of a polymeric electrolyte interposed therebetween; and assembling the sputtered side of said second substrate into juxtaposed contact with the other side of said third substrate with an ion conducting layer of a polymeric electrolyte interposed therebetween.

32. The process of claim 31, further comprising electrochemically processing at least one of said amorphous inorganic electrochromic material and said inorganic electrochromic material prior to said assembling steps.

33. An electrochromic mirror device comprising the electrochromic element of claim 1, 2, or 3, interposed between a pair of substrates, wherein one of the conductive electrodes is reflective and the other is transparent.

34. An electrochromic device comprising a plurality of electrochromic elements as recited by claims 1, 2, or 3, in juxtaposed surface to surface relation, wherein a transparent substrate is interposed between each pair of electrochromic elements and the plurality of electrochromic elements are interposed between a pair of transparent substrates.

* * * * *